United States Patent
Liu

(10) Patent No.: US 10,620,821 B2
(45) Date of Patent: Apr. 14, 2020

(54) PAGE SLIDING METHOD AND APPARATUS

(71) Applicant: TENCENT TECHNOLOGY (SHENZHEN) COMPANY LIMITED, Shenzhen (CN)

(72) Inventor: Renfang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/047,666

(22) Filed: Jul. 27, 2018

(65) Prior Publication Data

US 2018/0373410 A1 Dec. 27, 2018

Related U.S. Application Data

(63) Continuation of application No. PCT/CN2017/085449, filed on May 23, 2017.

(30) Foreign Application Priority Data

May 24, 2016 (CN) .......................... 2016 1 0348542

(51) Int. Cl.
*G06F 3/0488* (2013.01)
*G06F 3/0483* (2013.01)
*G06F 3/0485* (2013.01)

(52) U.S. Cl.
CPC .......... *G06F 3/0488* (2013.01); *G06F 3/0483* (2013.01); *G06F 3/0485* (2013.01); *G06F 2203/04808* (2013.01)

(58) Field of Classification Search
CPC .................................................... G06F 3/0488
See application file for complete search history.

(56) References Cited

U.S. PATENT DOCUMENTS

2010/0269038 A1* 10/2010 Tsuda .................... G06F 3/0485
715/702
2012/0260207 A1* 10/2012 Treskunov .......... G06F 3/04886
715/773

(Continued)

FOREIGN PATENT DOCUMENTS

| CN | 102662506 A | 9/2012 |
| CN | 103135909 A | 6/2013 |

(Continued)

OTHER PUBLICATIONS

The World Intellectual Property Organization (WIPO) International Search Report for PCT/CN2017/085449 dated Aug. 2, 2017 6 Pages (including translastion).

(Continued)

*Primary Examiner* — Jennifer N To
*Assistant Examiner* — Ashley M Fortino
(74) *Attorney, Agent, or Firm* — Anova Law Group, PLLC

(57) ABSTRACT

A page sliding method is provided. The method includes: detecting, by a computing terminal, a sliding touch control operation on a display interface. The sliding touch control operation involves multiple touch points on the display interface. The method also includes obtaining, by the computing terminal, the number of the multiple touch points and a sliding speed of at least one of the multiple touch points; and determining a sliding speed of the sliding touch control operation according to the number of the multiple touch points and the sliding speed of the at least one of the multiple touch points. The method also includes: sliding, by the computing terminal, the page on the display interface according to the sliding speed of the sliding touch control operation.

16 Claims, 3 Drawing Sheets

(56) References Cited

U.S. PATENT DOCUMENTS

2015/0317053 A1* 11/2015 Baek ................... G06F 3/0488
715/765
2015/0339002 A1* 11/2015 Arnold ................. G06F 3/0481
715/854

FOREIGN PATENT DOCUMENTS

| CN | 103309602 A | 9/2013 |
| CN | 104216625 A | 12/2014 |
| CN | 105843547 A | 8/2016 |
| JP | 2014071641 A | 4/2014 |

OTHER PUBLICATIONS

The State Intellectual Property Office of the People's Republic of China (SIPO) Office Action 1 for 201610348542.7 dated Jul. 12, 2018 8 Pages (including translation).

* cited by examiner

PAGE SLIDING METHOD AND APPARATUS

CROSS-REFERENCES TO RELATED APPLICATIONS

This application is a continuation application of PCT Patent Application No. PCT/CN2017/085449, filed on May 23, 2017, which claims priority to Chinese Patent Application No. 201610348542.7, filed with the Chinese Patent Office on May 24, 2016, and entitled "PAGE SLIDING METHOD AND APPARATUS", the entire contents of both of which are incorporated herein by reference.

FIELD OF THE TECHNOLOGY

The present disclosure relates to an electronic technology field, and in particular, to a page sliding method and apparatus.

BACKGROUND OF THE DISCLOSURE

With development of science and technology, frequency of using a mobile terminal to browse information by a user is becoming higher. A mobile terminal usually uses a touch screen, on which the user may slide a finger on a display interface to operate on a page. As a sliding speed of a finger becomes higher, a sliding speed of a page becomes higher, and the sliding speed of the finger is generally the sliding speed of the page. However, the display interface generally includes a lot of content, and a page (for example: a list, or a browser page) length may also be extremely long. If the user wants to view content on a page end, even if a finger of the user has an extremely high sliding speed, an extremely long time also need to be cost for the finger to slide to the page end, thereby excessively affecting use experience of the user.

SUMMARY

Embodiments of the present disclosure provide a page sliding method and apparatus. A page sliding velocity may be increased to locate page content quickly and conveniently, thereby reducing operation frequency.

One aspect of the present disclosure provides a page sliding method. The method includes: detecting, by a computing terminal, a sliding touch control operation on a display interface. The sliding touch control operation involves multiple touch points on the display interface. The method also includes obtaining, by the computing terminal, the number of the multiple touch points and a sliding speed of at least one of the multiple touch points; and determining a sliding speed of the sliding touch control operation according to the number of the multiple touch points and the sliding speed of the at least one of the multiple touch points. The method also includes: sliding, by the computing terminal, the page on the display interface according to the sliding speed of the sliding touch control operation.

Another aspect of the present disclosure provides a page sliding apparatus, including a touchscreen display, a memory, and a processor coupled to the memory. The processor is configured to detect a sliding touch control operation on a display interface of the touchscreen display. The sliding touch control operation involves multiple touch points on the display interface. The processor is also configured to obtain the number of the multiple touch points and a sliding speed of at least one of the multiple touch points; and determine a sliding speed of the sliding touch control operation according to the number of the multiple touch points and the sliding speed of the at least one of the multiple touch points. The processor is also configured to slide a page displaying on the display interface according to the sliding speed of the sliding touch control operation.

Another aspect of the present disclosure provides a non-transitory computer-readable storage medium storing computer program instructions executable by at least one processor. The computer program instructions cause the at least one processor to perform: detecting a sliding touch control operation on a display interface. The sliding touch control operation involves multiple touch points on the display interface. The computer program instructions also cause the at least one processor to perform: obtaining the number of the multiple touch points and a sliding speed of at least one of the multiple touch points; and determining a sliding speed of the sliding touch control operation according to the number of the multiple touch points and the sliding speed of the at least one of the multiple touch points. The computer program instructions also cause the at least one processor to perform: sliding the page on the display interface according to the sliding speed of the sliding touch control operation.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some embodiments of the present disclosure rather than all of the embodiments. All other embodiments obtained by a common person skilled in the art based on the embodiments of the present disclosure without creative efforts shall fall within the protection scope of the present disclosure.

Figure 1:
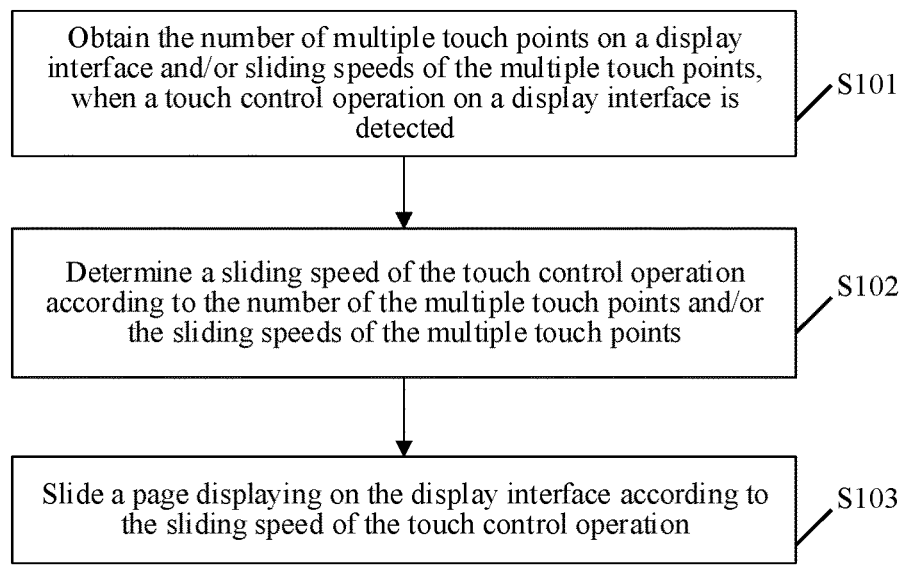
FIG. 1 is a flowchart of a page sliding method provided in one embodiment of the present disclosure.

Referring to FIG. 1, FIG. 1 is a flowchart of a page sliding method provided in an embodiment of the present disclosure. As shown in FIG. 1, in an exemplary embodiment of the present disclosure, a page sliding method may include the following steps:

S101: Detect a sliding touch control operation on a display interface, and obtain a number of multiple touch points and/or sliding speeds of the multiple touch points, where the sliding touch control operation involves the multiple touch points on the display interface. In some embodiments, the number of multiple touch points and a sliding speed of one of the multiple touch points are obtained. In some embodiments, the sliding speeds of all of the multiple touch points are obtained.

According to the embodiments of the present disclosure, when the sliding touch control operation being performed by a user on the display interface is detected, the touch point number of the multiple touch points on the display interface and/or a sliding speed of each touch point of the multiple touch points may be obtained.

Figure 2:
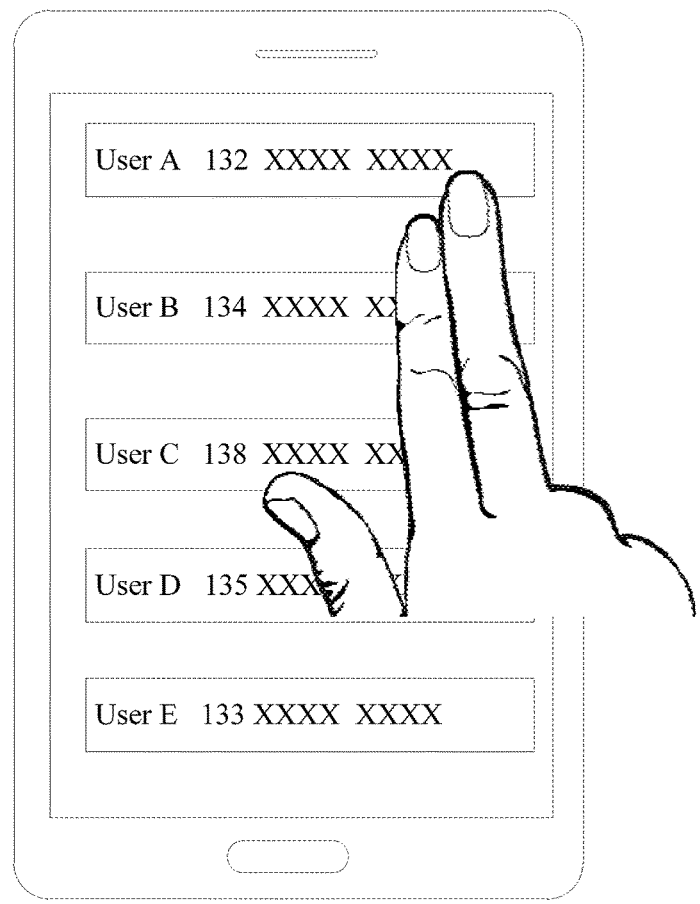
FIG. 2 is a schematic diagram for performing slide operation on a display interface provided in the embodiments of the present disclosure.

FIG. 2 is a schematic diagram for performing slide operation by the user on the display interface, displaying content on the display interface being an information list, the information list including contact information of multiple users. If the user needs to view a contact information of a certain user on an end of the information list, the user may slide by using multiple fingers (two fingers, three fingers, or the like) on the display interface. When the fingers leave the display interface after sliding a certain distance, and the sliding touch control operation being performed by the user on the display interface is detected/recorded by a terminal, the touch point number of the multiple touch points on the display interface may be obtained through an API (Application Programming Interface, application programming interface) of a system. For example, in an Android operating system, getPointerCount function in the MotionEvent class can be used to obtain the number of contact points. In addition, instantaneous acceleration(s) and time interval(s) corresponding to the instantaneous acceleration(s) during a movement of each touch point may be obtained, and the instantaneous acceleration may be multiplied by the instantaneous acceleration time to calculate and obtain the sliding speed of each touch point. In some embodiments, the page sliding is performed based on a 1:1 ratio of the finger sliding operation. That is, if a finger slides for one-pixel distance, the page slides for one-pixel distance. Assuming the multiple fingers touching the display screen slides for certain pixel-distances, the disclosed apparatus may slide the page for a combined pixel-distance of the multiple fingers. In one example, assuming N fingers have slid for a same pixel-distance p, the page slide distance can be equal to a multiplication of the finger number and the pixel distance, i.e., N*p. In one example, assuming two fingers have slid for respectively for pixel-distances p1 and p2, the page slide distance can be equal to a sum of the finger sliding pixel distances, i.e., p1+p2.

It can be understood that besides being used in a contact information list, the disclosed method can be applied in any applications that present contents in a long page, such as a web browser application, a shopping application, an e-book application, a music/video publishing and viewing platform application, a news application, etc. For example, in a news webpage listing multiple recommended news abstracts for multiple news topics, a user may want to skip certain group of news abstracts in a certain news topic, the disclosed method allows the user to perform a sliding gesture with multiple fingers and speed up the page sliding with less time and effort compared to performing single finger sliding gesture repeatedly.

S102: Determine a sliding speed of the sliding touch control operation according to the number of the multiple touch points and/or the sliding speed of at least one touch point the multiple touch points.

A target touch point of the multiple touch points may be determined; a sliding speed of the target touch point may be multiplied by the number of the multiple touch points, to calculate and obtain the sliding speed of the sliding touch control operational random touch point in the multiple touch points may be selected as the target touch point, or a touch point corresponding to greatest sliding speed among the multiple touch points is selected as the target touch point, or a first detected touch point in the multiple touch points is selected as the target touch point. For example, the user uses two fingers to perform a slide operation on the display interface, and the two fingers touch the display interface in chronological order to generate two touch points. First, a touch point formed by a finger which touches the display interface earliest touching the display interface may be used as the target touch point, and then the sliding speed of the target touch point is obtained. Finally, multiply the sliding speed of the target touch point by the touch point number 2 to calculate and obtain the sliding speed of the sliding touch control operation.

Optionally, according to the sliding speed of each touch point, a sum of sliding speeds of the multiple touch points may be calculated; and the sum of sliding speeds of the multiple touch points is used as the sliding speed of the sliding touch control operation. For example, a user uses two fingers to perform a slide operation on the display interface, the two fingers touching the display interface in chronological order to generate two touch points, a sliding speed of a touch point 1 being S1, a sliding speed of a touch point 2 being S2, and the sliding speed of the sliding touch control operation S=S1+S2.

Optionally, a preset single finger sliding speed may be obtained, and according to the number of the multiple touch points and the preset single finger sliding speed, the sliding speed of the sliding touch control operation may be calculated. Further, the number of the touch points may be multiplied by the preset single finger sliding speed to calculate and obtain a product, and the product may be used as the sliding speed of the sliding touch control operation.

Optionally, a touch point having a highest sliding speed in the multiple touch points may be determined as the target touch point, and according to the sliding speed of the target touch point and the number of the multiple touch points, the sliding speed of the sliding touch control operation is calculated and obtained. Further, a product calculated and obtained by multiplying the sliding speed of the target touch point by the number of the touch points may be used as the sliding speed of the sliding touch control operation.

Optionally, before determining the sliding speed of the sliding touch control operation according to the number of the multiple touch points and/or a sliding speed of at least one touch point of the multiple touch points, a slide direction of each touch point in the multiple touch points may be obtained; and if slide directions of the multiple touch points are consistent, an operation step that the sliding speed of the sliding touch control operation is determined according to the number of the multiple touch points and the sliding speed of the at least one of the multiple touch points is performed; if the slide directions of the multiple touch points are inconsistent, the current process is terminated, and the following operation steps are not performed. As shown in FIG. 2, the slide direction may be a direction toward any edge area (such as an upper edge area, or a lower edge area) starting from any area on the display interface.

S103: Slide a page displaying on the display interface according to the sliding speed of the sliding touch control operation.

The sliding speed of the sliding touch control operation may be used as a page sliding speed, and according to slide directions of the touch points, slide the page displaying on the display interface in accordance with the sliding speed of the sliding touch control operation. During a page sliding process, if a click instruction of the user on the display interface is detected, the page slide stops, and after the page stops sliding, if the sliding touch control operation of the user on the display interface is detected again, the same method above may be used to slide the page displaying continuously.

In the embodiments of the present disclosure, when a sliding touch control operation being performed by a user on a display interface is detected, obtain the touch point number of multiple touch points on the display interface and/or a sliding speeds of the multiple touch points of each contact; determine a sliding speed of the sliding touch control operation according to the touch point number of multiple touch points on the display interface and a sliding speed of at least one touch point of the multiple touch points; slide a page displaying on the display interface according to the sliding speed of the sliding touch control operation, so as to increase a sliding speed of the page, and locate page content quickly and conveniently, thereby reducing operation frequency, especially compared to sliding a page based on a single finger sliding gesture in prior art.

Figure 3:
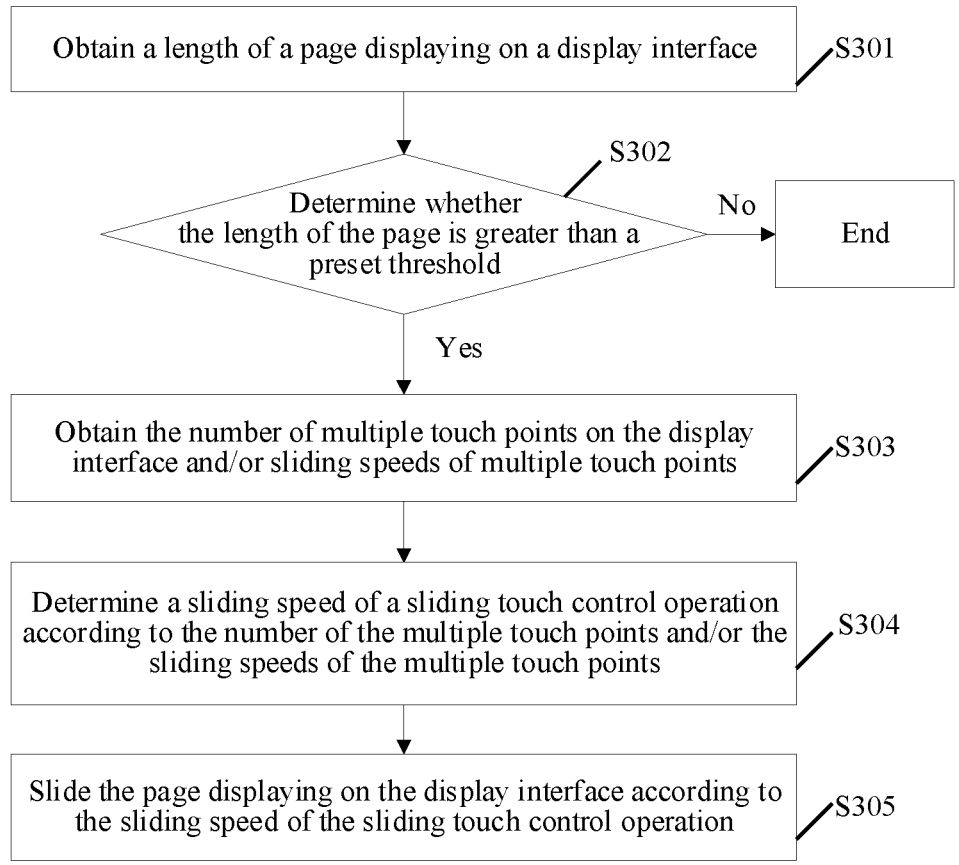
FIG. 3 is a flowchart of a page sliding method provided in one embodiment of the present disclosure.

Referring to FIG. 3, FIG. 3 is a flowchart of a page sliding method provided in another embodiment of the present disclosure. As shown in the figure, the method in this embodiment of the present disclosure includes the following steps:

S301: Obtain a length of the page displaying on the display interface.

For example, a page length of content displaying on a browser may be obtained, or a page length of a list is obtained.

S302: Determine whether the length of the page is greater than a preset threshold. Optionally, the preset threshold may be 3 times the screen display length or 4 times the screen display length.

S303: If the page length is greater than the preset threshold, obtain the number of multiple touch points and/or sliding speed of at least one touch point of the multiple touch points, or if the page length is not greater than the preset threshold, the current process is terminated, and the following operation steps are not performed.

FIG. 2 is a schematic diagram for performing slide operation by the user on the display interface, displaying content on the display interface being an information list, the information list including contact information of multiple users. If the user needs to view a contact information of a certain user on an end of the information list, the user may slide by using multiple fingers (two fingers, three fingers, and the like) on the display interface. When the fingers leave the display interface after sliding a certain distance, and the sliding touch control operation being performed by the user on the display interface is detected by a terminal, the touch point number of the multiple touch points on the display interface may be obtained through an API (Application Programming Interface, application programming interface) of a system. In addition, an instantaneous acceleration and instantaneous acceleration time during a movement of each contact may be obtained. By multiplying the instantaneous acceleration by the instantaneous acceleration time, calculate and obtain a sliding speed of each contact.

S304: Determine the sliding speed of a sliding touch control operation according to the number of the multiple touch points and/or a sliding speed of at least one touch point of the multiple touch points.

The target touch point of the multiple touch points may be determined; a sliding speed of the target touch point may be multiplied by the number of the multiple touch points, to calculate and obtain the sliding speed of the sliding touch control operation. A random contact in the multiple touch points may be selected as the target touch point, or a first generated contact in the multiple touch points is selected as the target touch point. For example, a user uses two fingers to perform a slide operation on the display interface, and the two fingers touch the display interface in chronological order to generate two touch points. First, a touch point formed by a finger which touches the display interface earliest touching the display interface may be as the target touch point, and then the sliding speed of the target touch point is obtained. Finally, multiply the sliding speed of the target touch point by the touch point number 2 to calculate and obtain the sliding speed of the sliding touch control operation.

Optionally, according to the sliding speed of each touch point, a sum of sliding speeds of the multiple touch points may be calculated; and the sum of sliding speeds of the multiple touch points is used as the sliding speed of the sliding touch control operation. For example, a user uses two fingers to perform a slide operation on the display interface, the two fingers touching the display interface in chronological order to generate two touch points, a sliding speed of a touch point 1 being S1, a sliding speed of touch point 2 being S2, and a sliding speed of the sliding touch control operation S=S1+S2.

Optionally, a preset single finger sliding speed may be obtained, and according to the number of the multiple touch points and the preset single finger sliding speed, the sliding speed of the sliding touch control operation may be calculated. Further, the number of the touch points may be multiplied by the preset single finger sliding speed to calculate and obtain a product, and the product may be used as the sliding speed of the sliding touch control operation.

Optionally, a touch point having a highest sliding speed in the multiple touch points may be determined as the target touch point, and according to a sliding speed of the target touch point and the number of the multiple touch points, the sliding speed of the sliding touch control operation is calculated and obtained. Further, a product calculated and obtained by multiplying the sliding speed of the target touch point by the number of the touch points may be used as the sliding speed of the sliding touch control operation.

Optionally, before determining the sliding speed of the sliding touch control operation according to the number of the multiple touch points and the sliding speed of at least one touch point of the multiple touch points, a slide direction of each touch point in the multiple touch points may be obtained; and if slide directions of the multiple touch points are consistent, an operation step that the sliding speed of the sliding touch control operation is determined according to the number of the multiple touch points and the sliding speed of at least one touch point of the multiple touch points is performed; if the slide directions of the multiple touch points are inconsistent, the current step is terminated, and the following operation steps are not performed. As shown in FIG. 2, the slide direction may be a direction directing to any edge area (such as an upper edge area, or a lower edge area) initiated from any area on the display interface.

S305: Slide the page displaying on the display interface according to the sliding speed of the sliding touch control operation.

The sliding speed of the sliding touch control operation may be used as a page sliding speed, and according to a slide direction of a touch point, slide a page displaying on the display interface in accordance with the sliding speed of the sliding touch control operation. During a page sliding process, if a click instruction of the user on the display interface is detected, the page slide stops, and after the page stops sliding, if the sliding touch control operation of the user on the display interface is detected again, the same method above may be used to slide a page displaying continuously.

In the embodiments of the present disclosure, when a sliding touch control operation being performed by a user on a display interface is detected, obtain the touch point number of multiple touch points on the display interface and/or a sliding speed of each contact of the multiple touch points; determine a sliding speed of the sliding touch control operation according to the touch point number of multiple touch points on the display interface and/or a sliding speed of each contact of the multiple touch points; slide a page displaying on the display interface according to the sliding speed of the sliding touch control operation, so as to increase a sliding velocity of the page, and locate page content quickly and conveniently, thereby reducing operation frequency.

Figure 4:
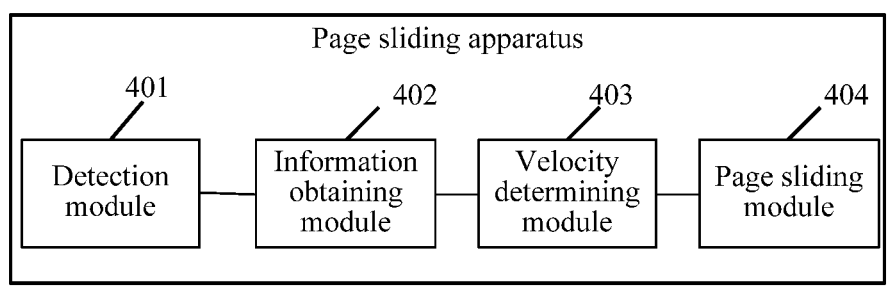
FIG. 4 is a schematic structural diagram of a page sliding apparatus according to the embodiments of the present disclosure.

As shown in FIG. 4, FIG. 4 is a schematic structural diagram of a page sliding apparatus provided in the embodiments of the present disclosure, and as shown in the figure, an apparatus in the embodiments of the present disclosure includes: a detection module 401, an information obtaining module 402, a velocity determining module 403, a page sliding module 404.

A detection module 401 is configured to detect a sliding touch control operation on a display interface, the sliding touch control operation generating the multiple touch points on the interface.

An information obtaining module 402 is configured to obtain sliding speeds of the multiple touch points or a number of the multiple touch points and a sliding speed of one touch point;

FIG. 2 is a schematic diagram for performing slide operation by a user on a display interface, displaying content on the display interface being an information list, the information list including contact information of multiple users. If the user needs to view a contact information of a certain user on an end of the information list, the user may slide by using multiple fingers (two fingers, three fingers, or the like) on the display interface. When the fingers leave the display interface after sliding a certain distance, and the sliding touch control operation being performed by the user on the display interface is detected by a terminal, the touch point number of the multiple touch points on the display interface may be obtained through an API (Application Programming Interface, application programming interface) of a system. In addition, an instantaneous acceleration and instantaneous acceleration time during a movement of each contact may be obtained, and the instantaneous acceleration may be multiplied by the instantaneous acceleration time, to calculate and obtain a sliding speed of each contact.

Optionally, the information obtaining module 402 is further configured to: obtain a length of a page displaying on the display interface; determine whether the length of the page is greater than a preset threshold; obtain the number of the multiple touch points and the sliding speeds of the multiple touch points in response to the length of the page being greater than the preset threshold.

A velocity determining module 403 is configured to determine the sliding speed of the sliding touch control operation according to the number of the multiple touch points and a sliding speed of at least one touch point of the multiple touch points.

A target touch point of the multiple touch points may be determined; a sliding speed of the target touch point may be multiplied by the number of the multiple touch points, to calculate and obtain the sliding speed of the sliding touch control operation. A random touch point in the multiple touch points may be selected as the target touch point, or a first generated touch point in the multiple touch points is selected as the target touch point. For example, a user uses two fingers to perform a slide operation on the display interface, and the two fingers touch the display interface in chronological order to generate two touch points. First, a touch point formed by a finger which touches the display interface earliest touching the display interface may be as the target touch point, and then the sliding speed of the target touch point is obtained. Finally, multiply the sliding speed of the target touch point by the touch point number 2 to calculate and obtain the sliding speed of the sliding touch control operation.

Optionally, according to the sliding speed of each touch point, a sum of sliding speeds of the multiple touch points may be calculated; and the sum of sliding speeds of the multiple touch points is used as the sliding speed of the sliding touch control operation. For example, a user uses two fingers to perform a slide operation on the display interface, the two fingers touching the display interface in chronological order to generate two touch points, a sliding speed of a touch point 1 being S1, a sliding speed of touch point 2 being S2, and the sliding speed of the sliding touch control operation S=S1+S2.

Optionally, a preset single finger sliding speed may be obtained, and according to the number of the multiple touch points and the preset single finger sliding speed, the sliding speed of the sliding touch control operation may be calculated. Further, the number of the touch points may be multiplied by the preset single finger sliding speed to calculate and obtain a product, and the product may be used as the sliding speed of the sliding touch control operation.

Optionally, a touch point having a highest sliding speed in the multiple touch points may be determined as the target touch point, and according to the sliding speed of the target touch point and the number of the multiple touch points, the sliding speed of the sliding touch control operation is calculated and obtained. Further, a product calculated and obtained by multiplying the sliding speed of the target touch point by the number of the touch points may be used as the sliding speed of the sliding touch control operation.

Optionally, before determining the sliding speed of the sliding touch control operation according to the number of the multiple touch points and the sliding speed of at least one touch point of the multiple touch points, a slide direction of each touch point in the multiple touch points may be obtained; and if slide directions of the multiple touch points are consistent, an operation step that the sliding speed of the sliding touch control operation is determined according to the number of the multiple touch points and the sliding speed of at least one touch point of the multiple touch points is performed; if the slide directions of the multiple touch points are inconsistent, the current step is terminated, and the following operation steps are not performed. As shown in FIG. 2, the slide direction may be a direction directing to any edge area (such as an upper edge area, or a lower edge area) initiated from any area on the display interface.

A page sliding module 404 is configured to slide the page displaying on the display interface according to the sliding speed of the sliding touch control operation.

The sliding speed of the sliding touch control operation may be used as a page sliding speed, and according to a slide direction of a touch point, slide the page displaying on the display interface in accordance with the sliding speed of the sliding touch control operation. During a page sliding process, if a click instruction of the user on the display interface is detected, the page slide stops, and after the page stops sliding, if the sliding touch control operation of the user on the display interface is detected again, the same method above may be used to slide the page displaying continuously.

In the embodiments of the present disclosure, when a sliding touch control operation being performed by a user on a display interface is detected, obtain the touch point number of multiple touch points on the display interface and/or a sliding speeds of the multiple touch points of each contact; determine a sliding speed of the sliding touch control operation according to the touch point number of multiple touch points on the display interface and/or a sliding speeds of the multiple touch points of each contact; slide a page displaying on the display interface according to the sliding speed of the sliding touch control operation, so as to increase a sliding velocity of the page, and locate page content quickly and conveniently, thereby reducing operation frequency.

Figure 5:
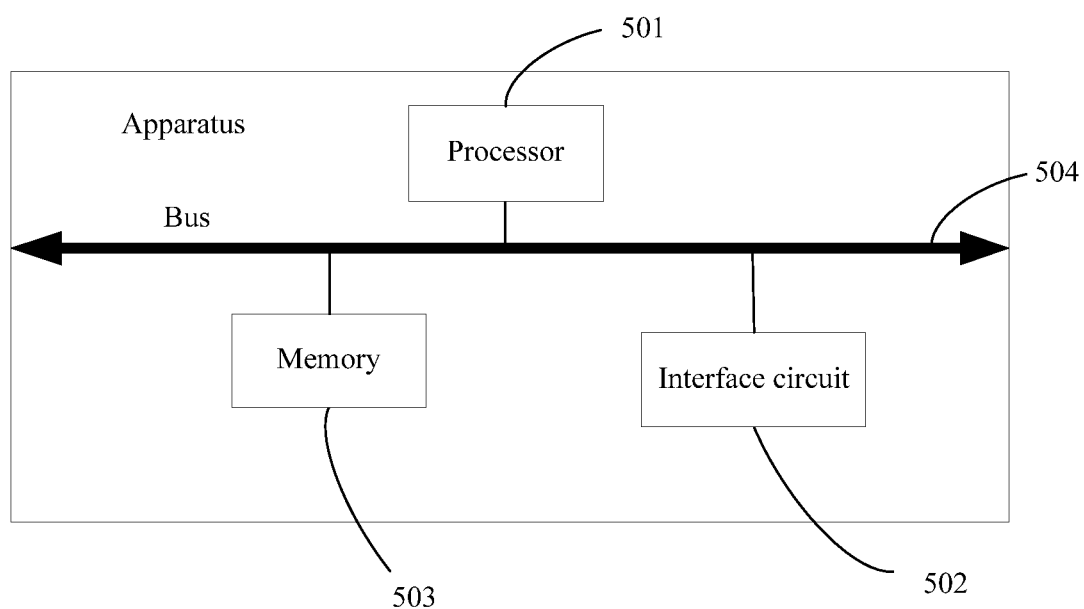
FIG. 5 is another schematic structural diagram of a page sliding apparatus according to the embodiments of the present disclosure.

Referring to FIG. 5, FIG. 5 is a schematic structural diagram of another page sliding apparatus provided in the embodiments of the present disclosure. As shown in FIG. 5, the apparatus includes a processor 501 and an interface circuit 502. A memory 503 and a bus 504 are also provided in the figure. The bus 504 connects the processor 501, the interface circuit 502 with the memory 503 and completes communications between thereof.

The processor 501 is configured to perform the following operation steps:

detecting a sliding touch control operation of a user on a display interface, and the sliding touch control operation generating multiple touch points on the display interface;

obtaining the number of the multiple touch points and/or sliding speeds of the multiple touch points;

determining a sliding speed of the sliding touch control operation according to the number of the multiple touch points and a sliding speed of at least one touch point of the multiple touch points; and sliding a page displaying on the display interface according to the sliding speed of the sliding touch control operation.

The processor 501 is configured to perform the following operation steps:

determining a target touch point of the multiple touch points; and obtaining the sliding speed of the sliding touch control operation by multiplying a sliding speed of the target touch point by the number of the multiple touch points.

The processor 501 being configured to perform the following operation steps:

selecting a random touch point in the multiple touch points as the target touch point;

selecting a first generated touch point in the multiple touch points as the target touch point; or selecting a touch point having a highest sliding speed in the multiple touch points as the target touch point.

The processor 501 is configured to perform the following operation steps:

calculating a sum of sliding speeds of the multiple touch points as the sliding speed of the sliding touch control operation according to a sliding speed of each touch point in the multiple touch points.

The processor 501 is configured to perform the following operation steps:

obtaining a length of a page displaying on the display interface;

determining whether the length of the page is greater than a preset threshold; and obtaining the number of the multiple touch points and/or the sliding speeds of the multiple touch points in response to the length of the page being greater than the preset threshold.

The processor 501 is configured to perform the following operation steps:

obtaining a slide direction of each touch point in the multiple touch points; and determining the sliding speed of the sliding touch control operation in response to the slide directions of the multiple touch points being consistent.

It should be noted that, the processor 501 may be a processing element, or may be multiple processing elements collectively. For example, the processing element may be a central processing unit (Central Processing Unit, CPU), or may be a specific integrated circuit (Application Specific Integrated Circuit, ASIC).

The apparatus may further include an input and output device, connecting to the bus 504, so as to connect to the processor 501 and other components by the bus. The input and output device can provide an input interface for an operator, so that the operator chooses a dispatched item through the input interface, or another interface, and other devices may be connected to the interface externally.

The memory 503 may be a storage device, or may be multiple storage elements collectively, and is used to store executable program code or, required parameters, data and the like when an application program operating device runs. In addition, the memory 503 may include a random access memory (RAM), or may include a non-volatile memory (non-volatile memory), such as a magnetic disk storage, or a flash (Flash).

The bus 504 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus 504 may include an address bus, a data bus, a control bus, and the like. For convenience of representation, only a bold line is used for representation in FIG. 5, but it does not represent that there is only one bus or one type of buses.

Implementing the embodiments of the present disclosure, when a sliding touch control operation being performed by a user on a display interface is detected, obtain the touch point number of multiple touch points on the display interface and/or a sliding speed of each touch point of the multiple touch points; determine a sliding speed of the sliding touch control operation according to the touch point number of multiple touch points on the display interface and/or a sliding speed of each touch point of the multiple touch points; slide a page displaying on the display interface according to the sliding speed of the sliding touch control operation, so as to increase a sliding velocity of the page, and locate page content quickly and conveniently, thereby reducing operation frequency.

It should be noted that, to simplify the description, the foregoing method embodiments are described as a series of action combination. But persons of ordinary skill in the art should know that the present application is not limited to any described sequence of the action, as some steps can adopt other sequences or can be performed simultaneously according to the present application. Secondarily, persons skilled in the art should know that the embodiments described in the specification all belong to exemplary embodiments and the involved actions and modules are not necessary for the present application.

In the foregoing embodiments, the description of each embodiment has respective focuses. For a part that is not described in detail in an embodiment, refer to related descriptions in other embodiments.

Persons of ordinary skill in the art understand that all or part of the steps of the methods in the embodiments may be implemented by a program instructing relevant hardware. The program may be stored in a computer readable storage medium, and the storage medium may be a flash drive, a read-only memory (English: Read-Only Memory, ROM for short), a random access memory (English: Random Access Memory, RAM for short), a magnetic disk, an optical disk, and the like.

The content loading method, relative apparatus, and system provided in the embodiments of the present disclosure are described above in detail. Although the principles and implementation manners of the present disclosure are described by using specific embodiments in this specification, the foregoing descriptions of the embodiments are only intended to help understand the method and core idea of the method of the present disclosure. Meanwhile, a person of ordinary skill in the art may make modifications to the specific implementation manners and application range according to the idea of the present disclosure. In conclusion, the content of the specification should not be construed as a limitation to the present disclosure.

What is claimed is:

1. A page sliding method, comprising:
   detecting, by a computing terminal, a sliding touch control operation on a display interface, the sliding touch control operation involving multiple touch points on the display interface;
   obtaining, by the computing terminal, a number of the multiple touch points and a sliding speed of at least one of the multiple touch points;
   determining, by the computing terminal, a sliding speed of the sliding touch control operation according to the number of the multiple touch points and the sliding speed of the at least one of the multiple touch points, including:
   obtaining the sliding speed of the sliding touch control operation by multiplying a sliding speed of a target touch point by the number of the multiple touch points, wherein the target touch point is one of the multiple touch points, and the sliding touch control operation is a single gesture performed by multiple fingers, each finger corresponding to one of the multiple touch points; and
   sliding, by the computing terminal, a page displaying on the display interface according to the sliding speed of the sliding touch control operation.

2. The method according to claim 1, further comprising one of:
   selecting a random touch point in the multiple touch points as the target touch point;
   selecting a first detected touch point in the multiple touch points as the target touch point; and
   selecting a touch point having a greatest sliding speed in the multiple touch points as the target touch point.

3. The method according to claim 1, wherein the obtaining, by the computing terminal, a number of the multiple touch points and a sliding speed of at least one of the multiple touch points comprises:
   obtaining a length of the page displaying on the display interface;
   determining whether the length of the page is greater than a preset threshold; and
   obtaining the number of the multiple touch points and the sliding speed of the at least one of the multiple touch points in response to the page length being greater than the preset threshold.

4. The method according to claim 1, wherein the determining, by the computing terminal, a sliding speed of the sliding touch control operation comprises:
   obtaining slide directions of the multiple touch points, each touch point having a corresponding slide direction; and
   determining the sliding speed of the sliding touch control operation in response to the slide directions of the multiple touch points being consistent.

5. The method according to claim 1, wherein sliding, by the computing terminal, the page displaying on the display interface comprises:
   determining a sum of pixel distances slid by the multiple fingers; and
   sliding the page by a distance proportionally to the sum of the pixel distances slid by the multiple fingers.

6. The method according to claim 1, wherein the multiple fingers are slid together in the sliding touch control operation.

7. A page sliding apparatus, comprising:
   a touchscreen display;
   a memory; and
   a processor coupled to the memory and configured to:
   detect a sliding touch control operation on a display interface of the touchscreen display, the sliding touch control operation involving multiple touch points on the display interface;
   obtain a number of the multiple touch points and a sliding speed of at least one of the multiple touch points;
   determine a sliding speed of the sliding touch control operation according to the number of the multiple touch points and the sliding speed of the at least one of the multiple touch points, including:
      obtaining the sliding speed of the sliding touch control operation by multiplying a sliding speed of a target touch point by the number of the multiple touch points, wherein the target touch point is one of the multiple touch points, and the sliding touch control operation is a single gesture performed by multiple fingers, each finger corresponding to one of the multiple touch points; and
   slide a page displaying on the display interface according to the sliding speed of the sliding touch control operation.

8. The apparatus according to claim 7, wherein the processor is further configured to:
   select a random touch point in the multiple touch points as the target touch point.

9. The apparatus according to claim 7, wherein the processor is further configured to:
   select a first detected touch point in the multiple touch points as the target touch point.

10. The apparatus according to claim 7, wherein the processor is further configured to:

select a touch point having a greatest sliding speed in the multiple touch points as the target touch point.

11. The apparatus according to claim 7, wherein the processor is further configured to:
   obtain a length of the page displaying on the display interface;
   determine whether the length of the page is greater than a preset threshold; and
   obtain the number of the multiple touch points and the sliding speed of the at least one of the multiple touch points in response to the length of the page being greater than the preset threshold.

12. The apparatus according to claim 7, wherein the processor is further configured to:
   obtain slide directions of the multiple touch points, each touch point having a corresponding slide direction; and
   determine the sliding speed of the sliding touch control operation in response to the slide directions of the multiple touch points being consistent.

13. A non-transitory computer readable storage medium storing computer program instructions executable by at least one processor to perform:
   detecting a sliding touch control operation on a display interface, the sliding touch control operation involving multiple touch points on the display interface;
   obtaining a number of the multiple touch points and a sliding speed of at least one of the multiple touch points;
   determining, by the computing terminal, a sliding speed of the sliding touch control operation according to the number of the multiple touch points and the sliding speed of the at least one of the multiple touch points, including:
      obtaining the sliding speed of the sliding touch control operation by: multiplying a sliding speed of a target touch point by the number of the multiple touch points, wherein the target touch point is one of the multiple touch points, and the sliding touch control operation is a single gesture performed by multiple fingers, each finger corresponding to one of the multiple touch points; and
   sliding a page displaying on the display interface according to the sliding speed of the sliding touch control operation.

14. The storage medium according to claim 13, wherein the computer program instructions further cause the at least one processor to perform one of:
   selecting a random touch point in the multiple touch points as the target touch point;
   selecting a first detected touch point in the multiple touch points as the target touch point; and
   selecting a touch point having a greatest sliding speed in the multiple touch points as the target touch point.

15. The storage medium according to claim 13, wherein the obtaining a number of the multiple touch points and a sliding speed of at least one of the multiple touch points comprises:
   obtaining a length of the page displaying on the display interface;
   determining whether the length of the page is greater than a preset threshold; and
   obtaining the number of the multiple touch points and the sliding speed of the at least one of the multiple touch points in response to the page length being greater than the preset threshold.

16. The storage medium according to claim 13, wherein the determining a sliding speed of the sliding touch control operation comprises:
   obtaining slide directions of the multiple touch points, each touch point having a corresponding slide direction; and
   determining the sliding speed of the sliding touch control operation in response to the slide directions of the multiple touch points being consistent.

* * * * *